US012597303B2

(12) United States Patent
Chamberlin et al.

(10) Patent No.: US 12,597,303 B2
(45) Date of Patent: Apr. 7, 2026

(54) IMPACT MONITORING SYSTEM

(71) Applicant: GM Global Technology Operations LLC, Detroit, MI (US)

(72) Inventors: Kurt Chamberlin, Bristol, RI (US); Matthew Edward Gilbert-Eyres, Rochester Hills, MI (US); Gayanie Jayasinghe, Southfield, MI (US); Noah Stone, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 189 days.

(21) Appl. No.: 18/475,115

(22) Filed: Sep. 26, 2023

(65) Prior Publication Data

US 2025/0104491 A1     Mar. 27, 2025

(51) Int. Cl.
| | |
|---|---|
| *G07C 5/08* | (2006.01) |
| *G01P 1/07* | (2006.01) |
| *G07C 5/00* | (2006.01) |
| *G07C 5/10* | (2006.01) |

(52) U.S. Cl.
CPC .............. *G07C 5/0816* (2013.01); *G01P 1/07* (2013.01); *G07C 5/008* (2013.01); *G07C 5/10* (2013.01)

(58) Field of Classification Search
CPC ........ G07C 5/0816; G07C 5/008; G07C 5/10; G07C 5/0808; G07C 5/0841; G01P 1/07
USPC ...................................................... 701/31.4
See application file for complete search history.

(56) References Cited

U.S. PATENT DOCUMENTS

| | | | | |
|---|---|---|---|---|
| 11,922,787 | B1 * | 3/2024 | Barcia ................. | G08B 21/043 |
| 2016/0203656 | A1 * | 7/2016 | Bhogal ................ | G07C 5/0808 |
| | | | | 701/32.2 |
| 2016/0280130 | A1 * | 9/2016 | Kia ...................... | G07C 5/0816 |
| 2018/0299884 | A1 * | 10/2018 | Morita .................. | G08G 1/202 |
| 2019/0266810 | A1 * | 8/2019 | Sato ......................... | G08G 1/00 |
| 2019/0354838 | A1 * | 11/2019 | Zhang .................. | G07C 5/0858 |
| 2019/0385386 | A1 * | 12/2019 | Davidson ............. | G07C 5/0858 |
| 2021/0049836 | A1 * | 2/2021 | Covington ............. | G07C 5/085 |
| 2021/0061027 | A1 * | 3/2021 | Da Deppo ............. | B60C 23/041 |
| 2021/0065482 | A1 * | 3/2021 | Panigrahi ................ | G06N 3/08 |
| 2021/0073873 | A1 | 3/2021 | Kawashima | |
| 2022/0107637 | A1 * | 4/2022 | Chan ...................... | G01S 19/21 |

(Continued)

*Primary Examiner* — Tuan C To
*Assistant Examiner* — Dominick Mulder
(74) *Attorney, Agent, or Firm* — Honigman LLP; Matthew H. Szalach; Jonathan P. O'Brien

(57) ABSTRACT

An impact monitoring system for a vehicle includes data processing hardware and memory hardware in communication with the data processing hardware. The memory hardware stores instructions that when executed on the data processing hardware cause the data processing hardware to perform operations. The operations performed by the data processing hardware include receiving sensor data from a plurality of sensors disposed along the vehicle and identifying an impact event based on the sensor data. The sensor data and the identified impact event are compared with a series of impact thresholds, and an impact score is determined based on the comparison of the sensor data and the identified impact event with the series of impact thresholds. The impact score is compared with an impact score hierarchy, the impact score hierarchy corresponding to the series of impact thresholds, and the impact event is monitored using updated sensor data.

19 Claims, 6 Drawing Sheets

(56) References Cited

U.S. PATENT DOCUMENTS

| | | | |
|---|---|---|---|
| 2022/0242427 A1* | 8/2022 | Petersen | ................. G07C 5/085 |
| 2025/0033660 A1* | 1/2025 | Jenkin | .................. B60W 40/02 |

* cited by examiner

IMPACT MONITORING SYSTEM

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against present disclosure.

The present disclosure relates generally to an impact monitoring system for a vehicle.

Vehicles travel along road systems and encounter many external factors during travel. As a result, engagement with the vehicle may cause parts of the vehicle to be altered, which may affect the functionality of the vehicle. While some vehicles are equipped with sensors that may provide an indication that an event has occurred, most vehicles utilize a blanket system that does not necessarily differentiate between severity levels or the type of event.

SUMMARY

In some aspects, a computer-implemented method that when executed by data processing hardware causes the data processing hardware to perform operations includes receiving sensor data from a plurality of sensors disposed along a vehicle. An impact event is identified based on the sensor data, and the sensor data and the identified impact event are compared with a series of impact thresholds. An impact score is determined based on the comparison of the sensor data and the identified impact event with the series of impact thresholds. The impact score is compared with an impact score hierarchy. The impact score hierarchy corresponds to the series of impact thresholds and includes a first tier impact score, a second tier impact score, and a third tier impact score. An operator of the vehicle is notified of the impact event based on the impact score and the impact score hierarchy. The impact event is monitored using updated sensor data, and an estimated travel distance is determined based on the impact event and the updated sensor data.

In some examples, the impact event may be determined to have an intermediate impact score that may correspond to the second tier impact score of the impact score hierarchy. In response to the determined intermediate impact score, the data processing hardware may recommend that the operator inspect the vehicle for impact effects. In other examples, the impact event may be determined to have a high impact score that may correspond to the third tier impact score of the impact score hierarchy. In response to the determined high impact score, the data processing hardware may receive a communication from a communication server to facilitate operation of the vehicle. Optionally, if the impact event has a high impact score then a pull-over location may be identified. In some examples, a component operative duration may be determined and the operator of the vehicle may be notified of the component operative duration. A service date for a component corresponding to the component operative duration may be determined and a notification including the service date may be issued. In some instances, third party devices may be notified of the impact event.

In other aspects, an impact monitoring system for a vehicle includes data processing hardware and memory hardware in communication with the data processing hardware. The memory hardware stores instructions that when executed on the data processing hardware cause the data processing hardware to perform operations. The operations performed by the data processing hardware include receiving sensor data from a plurality of sensors disposed along the vehicle and identifying an impact event based on the sensor data. The sensor data and the identified impact event are compared with a series of impact thresholds, and an impact score is determined based on the comparison of the sensor data and the identified impact event with the series of impact thresholds. The impact score is compared with an impact score hierarchy, the impact score hierarchy corresponding to the series of impact thresholds, and the impact event is monitored using updated sensor data.

In some examples, an estimated travel duration is determined based on the impact event and the updated sensor data. A component operative duration may be determined, and the operator of the vehicle may be notified of the component operative duration. Optionally, a notification may be issued that identifies the impact event based on the impact score and the impact score hierarchy. The impact event may be determined to have a low impact score that may correspond to a first tier impact score of the impact score hierarchy. In response to the determined low impact score, a notification may be issued including a recommended service date. In some instances, third party devices may be notified of the impact event and the impact score. Optionally, the impact monitoring system may recommend inspecting the vehicle in response to the impact event and the determined impact score.

In yet other aspects, an impact monitoring system may include data processing hardware and memory hardware in communication with the data processing hardware. The memory hardware stores instructions that when executed on the data processing hardware cause the data processing hardware to perform operations. The operations performed by the data processing hardware include receiving sensor data from a plurality of sensors disposed along a vehicle and identifying an impact event based on the sensor data. The sensor data and the identified impact event are compared with a series of impact thresholds, and an impact score is determined based on the comparison of the sensor data and the identified impact event with the series of impact thresholds. The impact score is compared with an impact score hierarchy. The impact score hierarchy corresponds to the series of impact thresholds. The impact event is monitored using updated sensor data.

In some examples, the impact score hierarchy includes a first tier impact score, a second tier impact score, and a third tier impact score and the series of impact thresholds includes a low impact threshold, an intermediate impact threshold, and a high impact threshold. The impact event may be determined to have a high impact score based on the high impact threshold. The high impact score may correspond to the third tier impact score of the impact score hierarchy. In response to the determined high impact score, a notification may be issued indicating the determined high impact score and including a pull-over recommendation. In some instances, a communication may be received from a communication server to facilitate operation of the vehicle and recommend a pull-over location of the pull-over event. Optionally, a notification may be issued to third party devices of the impact event and the determined high impact score. An estimated travel distance may be determined based on the impact event and the updated sensor data.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1:
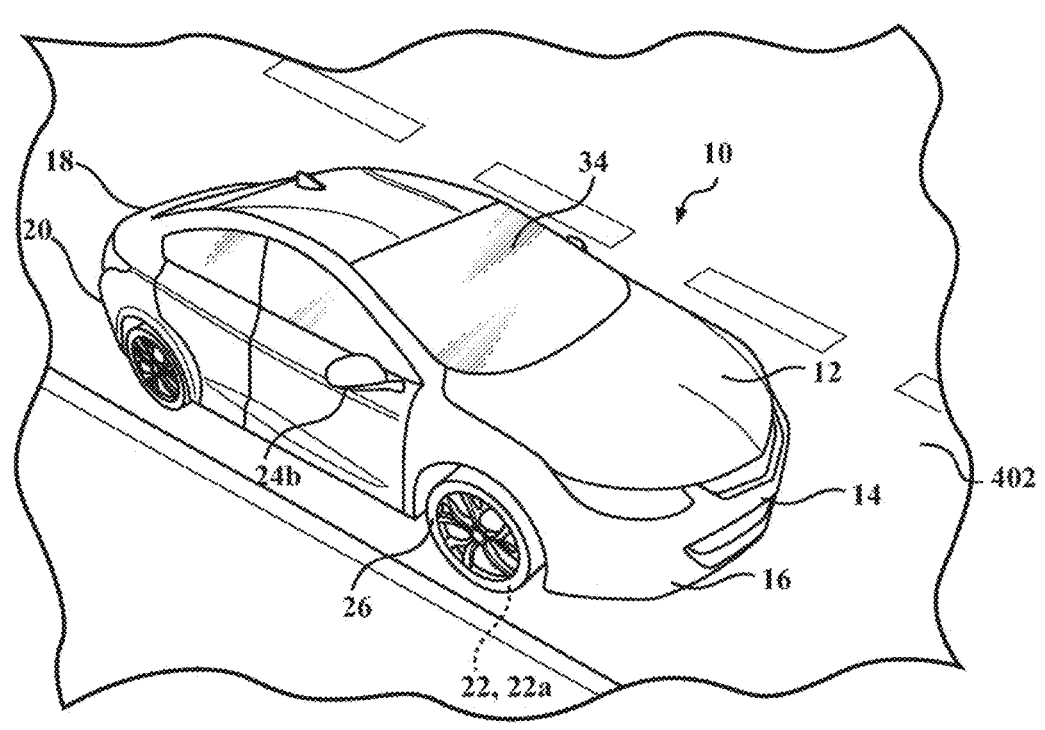
FIG. 1 is a perspective view of a vehicle according to the present disclosure on a road.
Figure 2:
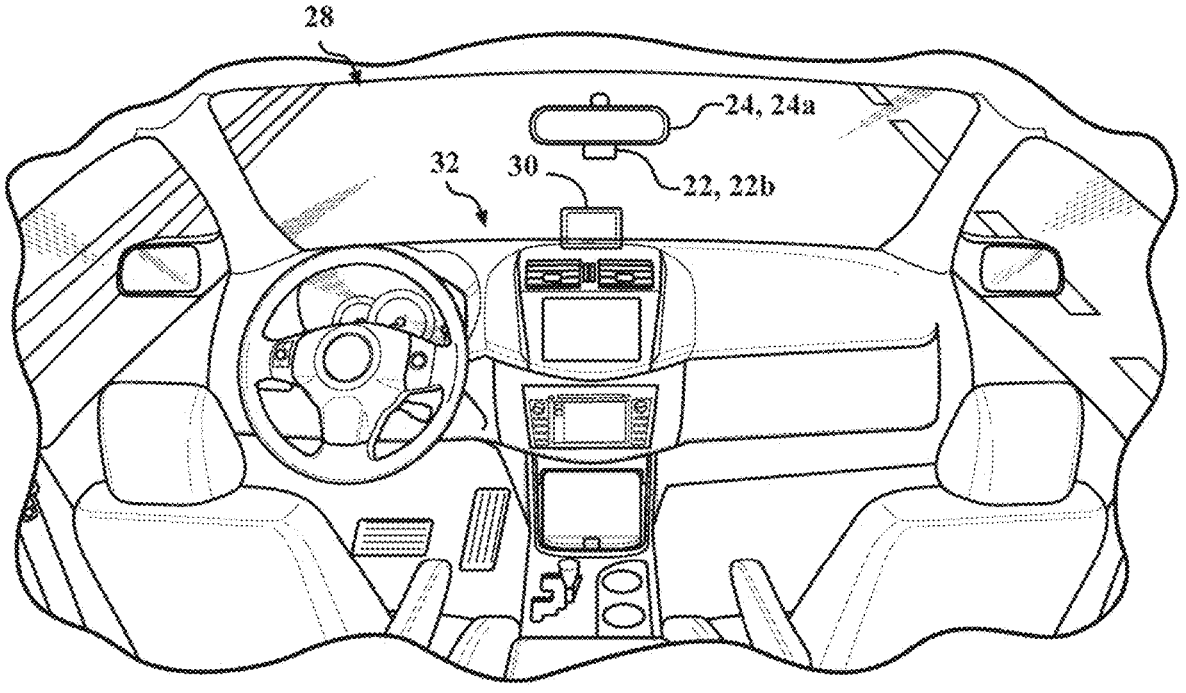
FIG. 2 is a partial perspective view of an interior cabin of a vehicle according to the present disclosure.
Figures 3, 4:
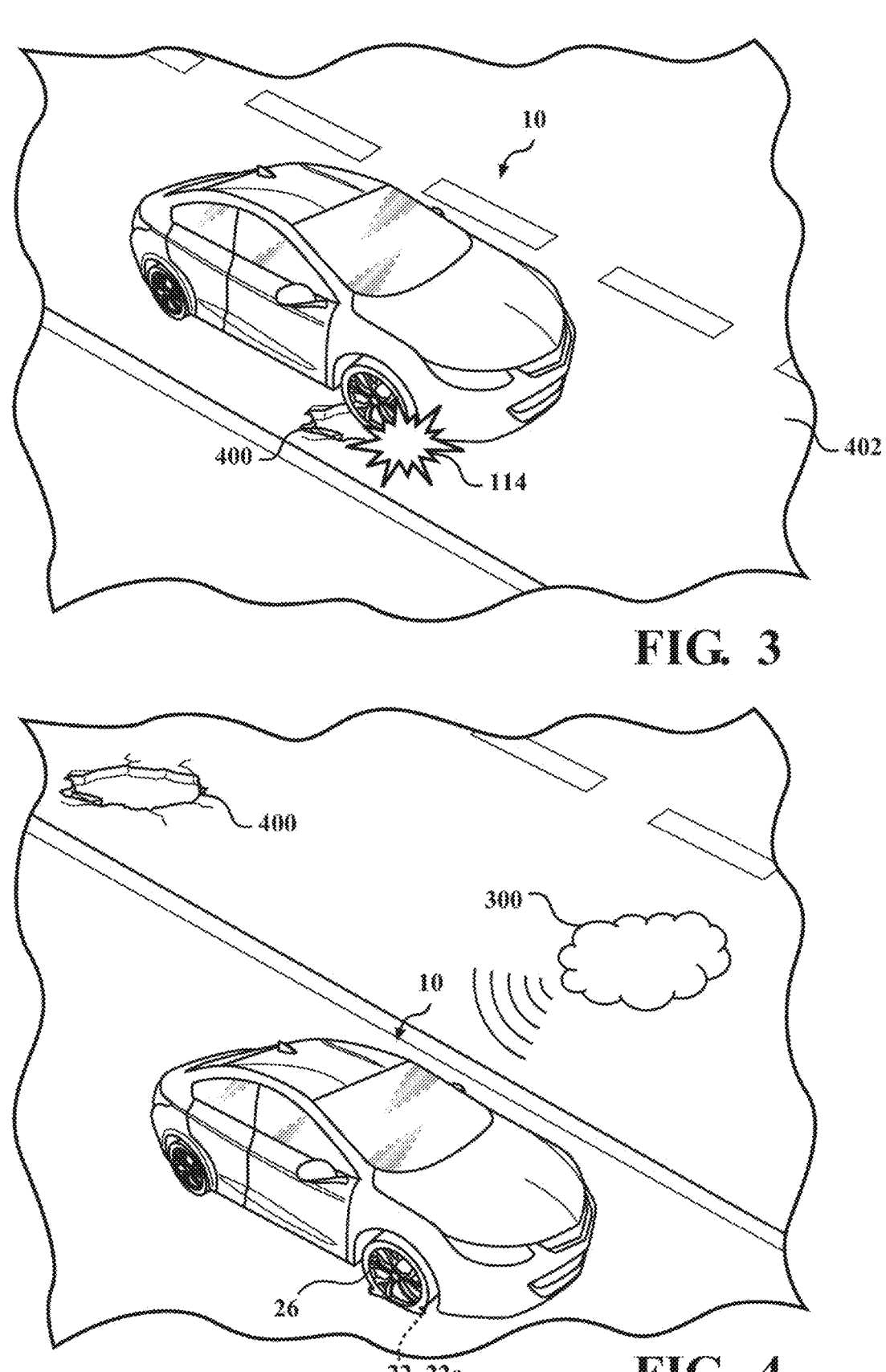
FIG. 3 is a perspective view of an impact event according to the present disclosure.
FIG. 4 is a perspective view of the impact event of FIG. 3 with a vehicle in a pull-over location according to the present disclosure.
Figure 5:
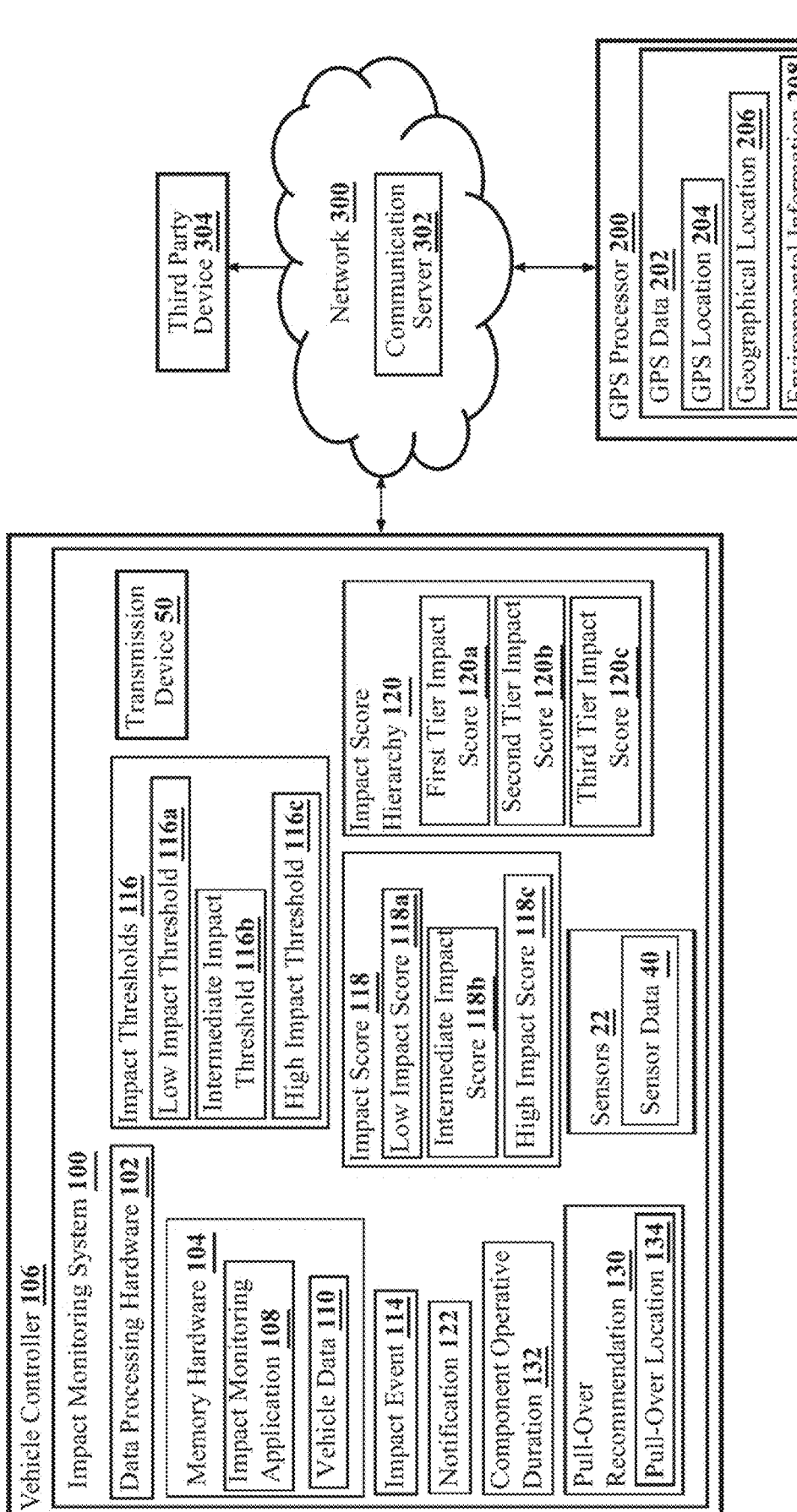
FIG. 5 is a functional block diagram for an impact monitoring system according to the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Referring to FIGS. 1-8, a vehicle 10 includes a vehicle body 12 equipped with an impact monitoring system 100. In some aspects of the disclosure, the vehicle 10 is an electric vehicle (EV) with autonomous or semi-autonomous capabilities. Additionally or alternatively, the vehicle 10 may be configured with an internal combustion engine (ICE). In other aspects, the vehicle 10 may be a hybrid vehicle incorporating both EV and ICE components and capabilities.

The vehicle body 12 may be generally divided into a vehicle forward portion 14 proximate a front bumper 16 of the vehicle body 12 and a vehicle rearward portion 18 proximate a rear bumper 20. As depicted in FIG. 1, the vehicle 10 includes a plurality of sensors 22 that may be incorporated with various elements of the vehicle body 12 including, but not limited to, rearview mirrors 24, the front bumper 16, and the rear bumper 20. For example, a tire pressure sensor 22a may be configured to detect a change in pressure within one or more tires 26 of the vehicle 10. The sensors 22 may also include other vehicle sensors 22 including, but not limited to, proximity sensors, light detection and ranging (LIDAR) sensors, and imaging sensors that may be incorporated as part of the vehicle body 12.

With reference now to FIGS. 2-5, an interior 28 of the vehicle 10 is defined by the vehicle body 12 and includes an interior rearview mirror 24a and a display device 30. The interior rearview mirror 24a may be equipped with one or more of the plurality of sensors 22 including, but not limited to, an imager 22b. It is also contemplated that the imager 22b may be positioned on exterior rearview mirrors 24b. The imager 22b is configured to capture a surrounding vehicle environment, as described further below.

The display device 30 may be situated at a dashboard 32 of the vehicle 10 and is configured to display information related to the vehicle 10 to an occupant, including a driver or operator, of the vehicle 10. In some aspects, the display device 30 may be a heads-up display (HUD) integrated with a windshield 34 of the vehicle 10. In other examples, the display device 30 may be a tablet device integrated with the dashboard 32 and configured with capacitive sensors for operative functions of the display device 30. As described in more detail below, the display device 30 may display information pertaining to the vehicle 10 to the operator before, during, and after operation of the vehicle 10.

With further reference to FIGS. 2-5, the impact monitoring system 100 is communicatively coupled to the display device 30 and the sensors 22. The impact monitoring system 100 is integrated with the vehicle 10 and includes data processing hardware 102 and memory hardware 104 that may each be configured as part of a vehicle controller 106. The data processing hardware 102 is configured to perform operations of the impact monitoring system 100, and the memory hardware is in communication with the data processing hardware 102 and stores instructions that when executed on the data processing hardware 102 causes the data processing hardware 102 to perform the operations. The operations performed by the data processing hardware 102 may include initiating an impact monitoring application 108 that may be stored in the memory hardware 104.

The impact monitoring application 108 may be configured as a user facing interface of the impact monitoring system 100. The impact monitoring application 108 receives and incorporates sensor data 40 from the plurality of sensors 22 and vehicle data 110 that is stored in the memory hardware 104. The vehicle controller 106 may display the impact monitoring application 108 on the display device 30. As described herein, the impact monitoring application 108 may present notifications 112 on the display device 30 in response to an impact event 114. The impact event 114 may be categorized as an event affecting the operative function of the vehicle 10. Examples of the impact event 114 may include, but are not limited to, one or more of the tires 26 engaging a pothole or other road object, a puncture of one or more of the tires 26, a crack in a suspension of the vehicle 10, engagement between an external object and the vehicle 10, changes in alignment, repeated rattling or clicking noises, exhaust effects, among other examples. For example, the impact event 114 illustrated in FIGS. 3 and 4 corresponds to one of the tires 26 in a flattened state after engaging a pothole 400 along a road 402.

With further reference to FIGS. 2-5, the impact monitoring system 100 may interconnect the vehicle controller 106 with a GPS processor 200 and a network 300. The vehicle controller 106 may also include to a transmission device 50 of the vehicle 10 that is communicatively coupled with the network 300 to transmit audio messages from a communication server 302 to the operator of the vehicle 10. The transmission device 50 may also transmit the vehicle data 110 and the impact event 114 stored on the vehicle controller 106 with the communication server 302. The transmission device 50 may, at least in part, communicatively couple the vehicle controller 106 to the network 300 for wireless communication capabilities including, in some aspects, wireless calling and emergency communications. In some examples, the transmission device 50 is an OnStar® system that includes operative functions including, but not limited to, in-vehicle security, emergency services, turn-by-turn navigation, and remote diagnostics, which may be executed at least in part between the vehicle controller 106 and the network 300.

The vehicle controller 106 is also communicatively coupled to the GPS processor 200 via the network 300 to provide GPS data 202, such as a GPS location 204 of the vehicle 10, to the impact monitoring system 100. For example, the GPS data 202 may include a surrounding geographical location 206 corresponding to a route of the vehicle 10 and environmental information 208 relative to the vehicle 10 monitored both during transit and in a stationary position. The environmental information 208 includes information including, but not limited to, road conditions, road curvatures, road grade, building locations, and topographical information. The environmental information 208 may include additional environmental information 208 related to the surroundings of the vehicle 10 that may be advantageous to transmit to the vehicle controller 106. The impact monitoring system 100 may query the GPS processor 200 for the GPS data 202 in response to the impact event 114, as described below.

The GPS processor 200 transmits the geographical location 206 and the environmental information 208 over the network 300 to the vehicle controller 106. As mentioned above, the network 300 may include the communication server 302 communicatively coupled to the transmission device 50 to send and receive signals. For example, the communication server 302 may obtain the GPS data 202 from the GPS processor 200 and communicate the GPS data 202 directly with the operator or driver of the vehicle 10 via the transmission device 50. In some examples, the communication server 302 may also communicate the GPS data 202 to the vehicle controller 106 for analysis as part of the impact monitoring system 100. In other examples, the communication server 302 is configured to provide roadside assistance to the operator of the vehicle 10 in response to the impact event 114. While communicated GPS data 202 may be included as part of the roadside assistance, it is also contemplated that the communication server 302 may provide step-by-step instructions for responding to the impact event 114 where appropriate.

Referring still to FIGS. 2-5, the vehicle data 110 stored in the memory hardware 104 includes, in some aspects, information pertaining to a speed of the vehicle 10, a mechanical condition of the vehicle 10, and an electrical condition of the vehicle 10. The vehicle data 110 may also include other information about the vehicle 10, such as trip information and/or, in an EV example, battery life of the vehicle 10. The vehicle controller 106 may utilize the vehicle data 110 in combination with the sensor data 40 to monitor a vehicle environment during operation of the vehicle 10 and during various vehicle procedures.

For example, the impact monitoring system 100 may detect a change in speed that may be inconsistent with the executions of the operator, which may at least partially inform the impact event 114. In some instances, a rapid decrease in speed after an impact event 114 may indicate potential damage to the vehicle 10. The impact monitoring system 100 may identify the reduction in speed when assessing the vehicle data 110 in view of the impact event 114. In other examples, the impact event 114 may be a result of an electrical impact event 114, such as a thermal runaway event. It is contemplated that the impact event 114 generally corresponds to any event that may impact or otherwise affect the operation of the vehicle 10.

The vehicle controller 106 is configured to continuously receive the sensor data 40 from each of the plurality of sensors 22. The data processing hardware 102 processes the sensor data 40 and monitors for potential impact events 114. In some examples, multiple impact events 114 may be detected from the sensor data 40. For example, if the vehicle 10 engages a pothole, the sensor data 40 may include data corresponding to a loss in tire pressure from the tire pressure sensor 22a and suspension impacts. In other examples, a single impact event 114 may be detected. The sensor data 40 may also include image data from the imager 22b, which may inform the impact event 114 and subsequent evaluation by the impact monitoring system 100. The data processing hardware 102 may identify one or more impact events 114 and compare with a series of impact thresholds 116 stored within the memory hardware 104.

The series of impact thresholds 116 include a low impact threshold 116a, an intermediate impact threshold 116b, and a high impact threshold 116c. Each of the impact thresholds 116 includes a range of impact events 114. In some examples, the impact events 114 may cumulatively surpass one or more of the impact thresholds 116, such that an isolated impact event 114 may be categorized based on a lower impact threshold 116, but the cumulative impact events 114 may instead be categorized based on a higher impact threshold 116. The data processing hardware 102 is configured to assign an impact score 118 to the impact event 114. The impact score 118 is determined based on the comparison of the sensor data 40 and the identified impact event 114 with the impact thresholds 116.

The impact score 118 is thus categorized by one of the low impact threshold 116a, the intermediate impact threshold 116b, and the high impact threshold 116c. The impact score 118 may subsequently be compared with an impact score hierarchy 120 stored within the memory hardware 104. The impact score hierarchy 120 includes a first tier impact score 120a, a second tier impact score 120b, and a third tier impact score 120c. The impact score hierarchy 120 generally aligns with the impact thresholds 116 in that the first tier impact score 120a corresponds with the low impact threshold 116a, the second tier impact score 120b corresponds with the intermediate impact threshold 116b, and the third tier impact score 120c corresponds with the high impact threshold 116c. The impact score hierarchy 120 is utilized by the vehicle controller 106 to determine a response by the impact monitoring application 108.

Thus, the data processing hardware 102 first determines the impact store 118 based on the sensor data 40 and detected impact event 114 and then determines a response by the impact monitoring system 100 based on the comparison of the impact score 118 with the impact score hierarchy 120. Example action responses by the impact monitoring system 100 are described herein with respect to each impact score hierarchy 120. The described example action responses are presented as examples, and the action responses by the impact monitoring system 100 are not limited by the presented examples.

With further reference to FIGS. 2-5, after comparison with the impact score threshold 116, the impact score 118 may be categorized by one of a low impact score 118a, an intermediate impact score 118b, and a high impact score 118c. Each of the impact scores 118 respectively correspond to the impact score thresholds 116 and the impact score hierarchy 120. If the data processing hardware 102 determines the impact event 114 has a low impact score 118a, then minimal action is taken by the impact monitoring system 100. For example, the impact monitoring system 100 continues to monitor updated sensor data 40 throughout operation of the vehicle 10. The impact monitoring system 100 stores the sensor data 40 associated with the impact event 114 in the memory hardware 104. If the data processing hardware 102 determines a change in the sensor data 40 that may alter the determined impact score 118, then the impact monitoring system 100 may update the impact score 118. Thus, the impact scores 118 may be continuously monitored and updated based on the updated sensor data 40 received during operation of the vehicle 10.

The intermediate impact score 118b corresponds to the second tier impact score 120b, which may trigger the impact monitoring application 108 to issue a notification 112 to the operator of the vehicle 10 indicating the impact event 114. For example, the notification 112 may recommend to the operator inspect the vehicle 10 for potential impact effects as a result of the impact event 114. Additionally or alternatively, the notification 112 may recommend the operator monitor the vehicle 10 for any resultant impact effects from the impact event 114. While the intermediate impact score 118b is greater than the low impact score 118a, the intermediate impact score 118b may result in monitoring, similar to the execution as result of the low impact score 118a. The intermediate impact score 118b encompasses a range of impact events 114 and is the impact score 118 most likely to result in accumulation over time. For example, the impact event 114 may be categorized as having an intermediate impact score 118b based on the initial sensor data 40 received after the impact event 114. However, the impact score 118 may be revised based on update sensor data 40 received during continued operation of the vehicle 10.

Referring still to FIGS. 2-5, the high impact score 118c corresponds to the third tier impact score 120c, which triggers the impact monitoring application 108 to issue a notification 112 and for the impact monitoring system 100 to activate the transmission device 50 to communicate with the communication server 302. The communication server 302 may send audio transmission via the transmission device 50 for receipt by the operator of the vehicle 10. For example, the transmission device 50 may communicate instructions from the communication server 302 in response to the impact event 114. The instructions may include, but are not limited to, a pull-over recommendation 130 and guidance to assess the result of the impact event 114. The operator may indicate that the impact effects may be remedied or at least partially addressed, and the communication server 302 may provide step-by-step guidance to execute a correction procedure.

In some examples, the transmission device 50 is configured to contact a live advisor and/or may automate a call to the live advisor via the communication server 302. Further, the transmission device 50 may cooperate with the vehicle controller 106 to crowdsourced data from third party devices 304 over the network 300 that may inform the impact event 114. The vehicle controller 106 may store the crowdsource data to identify locations along the road 402 that may be high risk. A high risk location may correspond with a potential for an impact event 114 with a high impact score 118c and/or correspond with a third tier impact score 120c. In some examples, the transmission device 50 may also communicate with the communication server 302 in the event that the impact event 114 has a low impact score 118a and/or an intermediate impact score 118b.

The transmission device 50 may relay data related to the impact event 114 to the communication server 302. In addition to relaying data to the communication server 302, the impact monitoring system 100 may predict a component operative duration 132. The component operative duration 132 may be communicated with the operator via a notification 112, mentioned above, on the impact monitoring application 108. The component operative duration 132 may correspond to an estimated travel distance of which the vehicle 10 may travel before encountering potential long-term impact effects.

It is also contemplated that the impact monitoring system 100 may determine, based on the component operative duration 132, a recommended service date for the respective component. The recommended service date may be presented to the operator via the notification 112 on the display device 30. The notification 112 may be displayed on the display device 30 in response to the impact monitoring system 100 identifying the impact event 114 and determining the impact score 118. Further, the impact monitoring system 100 may record in the memory hardware 104 the date and time associated with the impact event 114 for future analysis and reference in determining the component operative duration 132 and the recommended service date.

With continued reference to FIGS. 2-5, the notification 112 displayed on the display device 30 may prompt the operator to either take action in response to the impact event 114 or, temporarily, ignore the impact event 114. It is contemplated that the option of ignoring the impact event 114 may be associated with the low impact score 118*a* and/or the intermediate impact score 118*b*. As mentioned above, the impact monitoring system 100 may present the pull-over recommendation 130 where the operator of the vehicle 10 may safely reposition the vehicle 10 off of the road 402. In some examples, the communication server 302 may communicate the pull-over recommendation 130 with the operator. The pull-over recommendation 130 may be identified by the impact monitoring system 100 through communication with the GPS processor 200.

In the event that the impact event 114 has a high impact score 118*c* the impact monitoring system 100 will notify the operator of immediate attention and recommend an expedited stoppage procedure. In response, the vehicle controller 106 will identify a pull-over location 134 and notify the operator of the pull-over recommendation 130 including the pull-over location 134 to inspect the vehicle 10 for impact effects. As mentioned above, the impact monitoring system 100 is communicatively coupled with the GPS processor 200 to identify the pull-over location 134 once the pull-over recommendation 130 is issued. The GPS processor 200 utilizes the GPS location 204 of vehicle 10 in addition to the geographical location 206 and the environmental information 208 of the area surrounding the vehicle 10. Each of the GPS location 204, the geographical location 206, and the environmental information 208 are communicated with the impact monitoring system 100 as GPS data 202. The impact monitoring system 100 utilizes the GPS data 202 to determine the pull-over location 134.

The impact monitoring system 100 may also utilize the GPS data 202 in combination with the network 300 to communicate with third party devices 304 to alert nearby vehicles of the impact event 114. In some examples, the impact monitoring system 100 may utilize the GPS data 202 to communicate the location of the impact event 114, including the environmental information 208 that may be related to the impact event 114. Thus, third party devices 304 may be alerted to potential external factors that may have resulted in the impact event 114. It is also contemplated that the impact monitoring system 100 may alert the third party devices 304 of the presence of the vehicle 10 in the pull-over location 134 to assist in providing space around the vehicle 10. For example, third party drivers may otherwise be unaware of the vehicle 10 in the pull-over location 134, so the impact monitoring system 100 may issue, via the network 300, an alert that the vehicle 10 is in the pull-over location 134.

Figure 6:
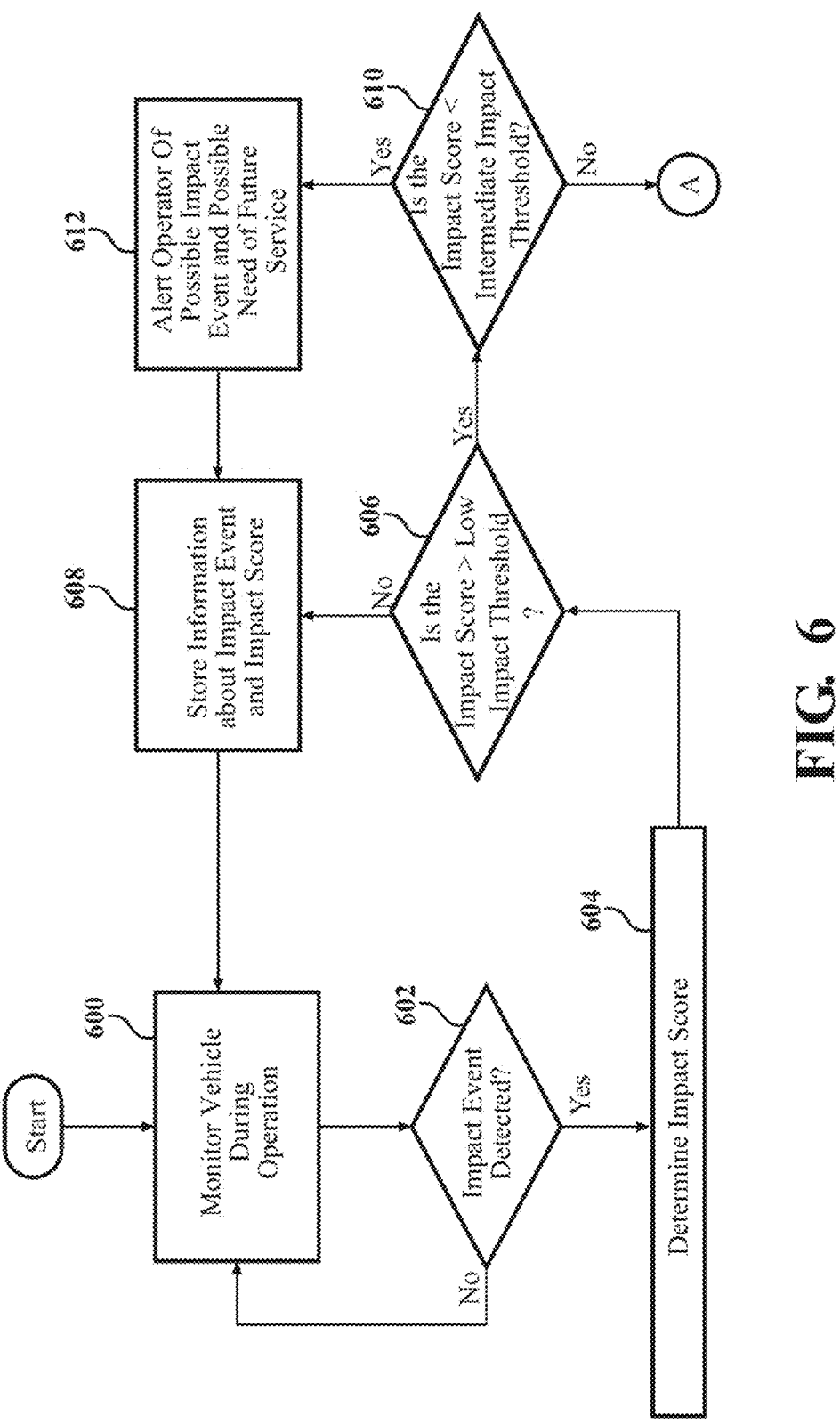
FIG. 6 is an example flow diagram of an impact monitoring system according to the present disclosure.
Figure 7:
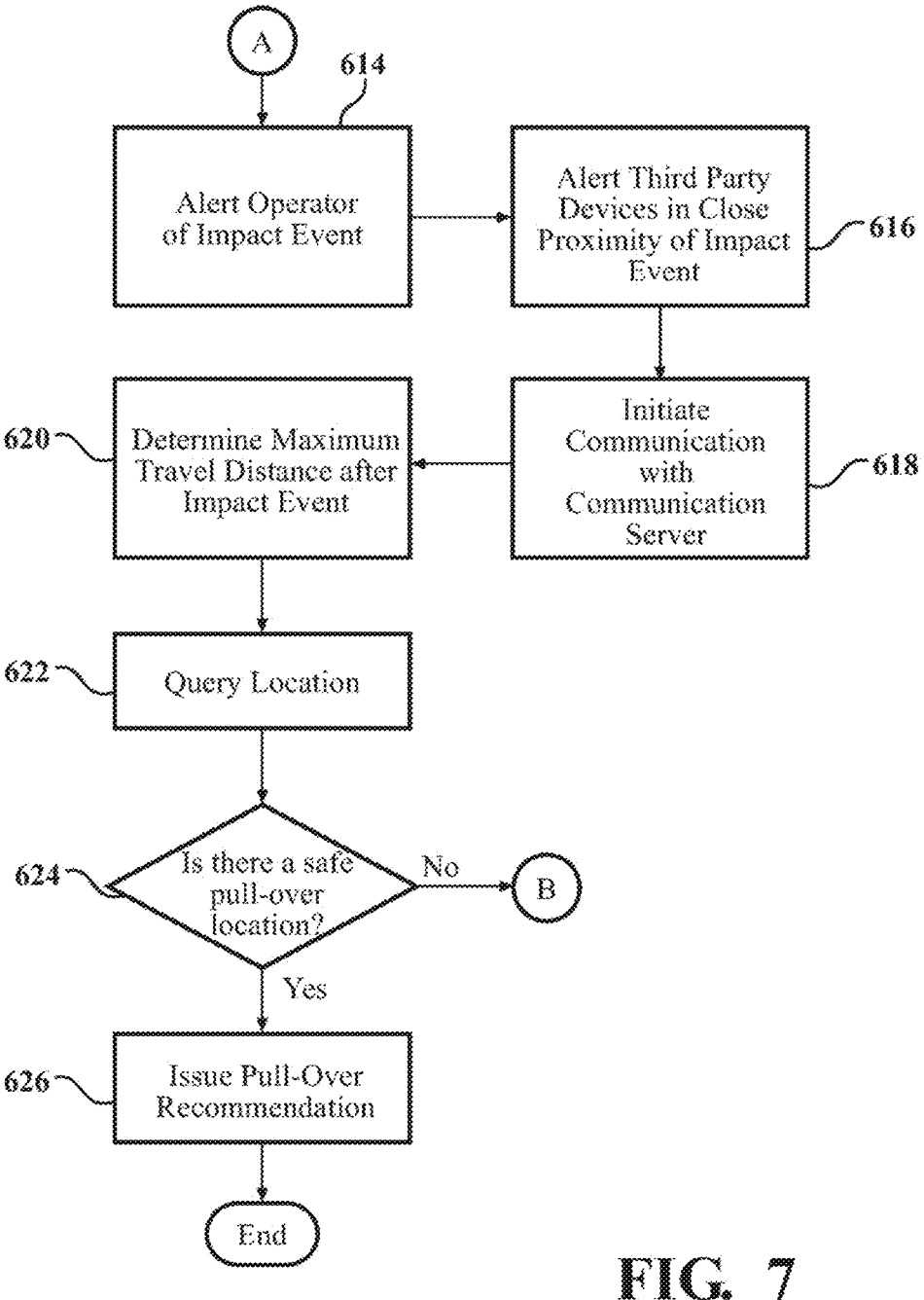
FIG. 7 is an example flow diagram of the impact monitoring system of FIG. 6.
Figure 8:
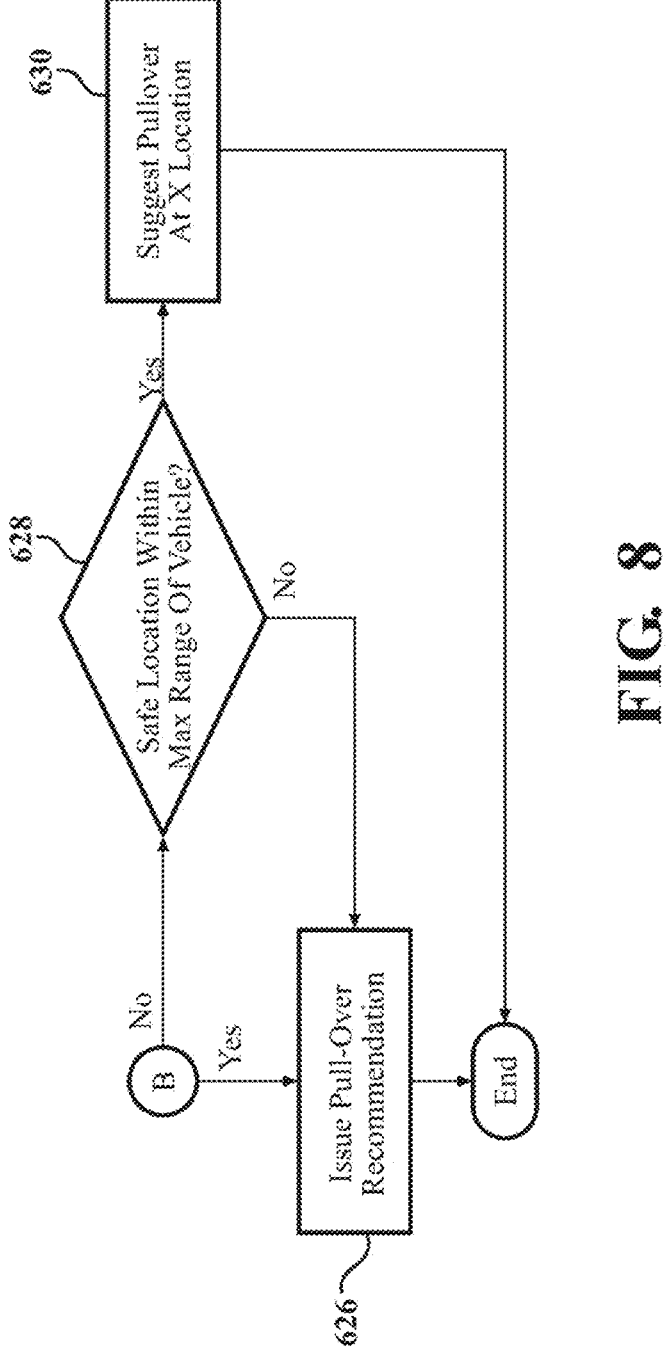
FIG. 8 is an example flow diagram of the impact monitoring system of FIG. 7.

Referring now to FIGS. 6-8, the impact monitoring system 100 is outlined with respect to the various steps leading up to and in response to the impact event 114. At 600, the impact monitoring system 100 monitors the vehicle 10 during operation. The impact monitoring system 100 identifies various events during operation to determine, at 602, whether an impact event 114 was detected. If no impact event 114 is detected, then the impact monitoring system 100 continues to monitor the vehicle 10. If an impact event 114 is detected, then the impact monitoring system 100, at 604, determines the impact score 118. At 606, the impact monitoring system 100 determines whether the impact score 118 is greater than the low impact threshold 116*a*. If the impact score 118 is less than the low impact threshold 116*a*, then the impact monitoring system 100, at 608, stores data associated with the impact event 114 and returns to monitoring the vehicle 10. If the impact score 118 is greater than the low impact threshold 116*a*, then the impact monitoring system 100, at 610, determines whether the impact score is less than the intermediate impact threshold 116*b*. If the impact score 118 is less than the intermediate impact threshold 116*b*, then the impact monitoring system 100, at 612, alerts the operator of the impact event 114 and the possible need for future service. The impact monitoring system 100 then proceeds, at 608, to store the data associated with the impact event 114 and, at 600, monitor the vehicle 10.

If the impact score 118 is greater than the intermediate impact threshold 116*b*, then the impact monitoring system, at 614, alerts the operator of the impact event 114. The impact monitoring system 100 may also, at 616, alert third party devices 304 that may be in close proximity to the vehicle 10 of the impact event 114. The impact monitoring system 100 may then, at 618, initiate communication with the communication server 302 via the transmission device 50 and the network 300. Next, the impact monitoring system 100, at 620, determines a maximum travel distance after the impact event 114. For example, the impact monitoring system 100 may evaluate the GPS data 202 and the impact score 118 to determine a severity of the impact event 114. In some examples, the impact monitoring system 100 may, at 622, query the GPS location 204 from the GPS processor 200. The impact monitoring system 100, at 624, determines whether there is a safe pull-over location 134 based on the GPS data 202. If there is a safe pull-over location 134, then the impact monitoring system 100, at 626, issues the pull-over recommendation 130.

If there is not a safe pull-over location 134 nearby the GPS location 204 of the vehicle 10, then the impact monitoring system 100, at 628, determines whether there is a pull-over location within the maximum travel distance of the vehicle 10. If there is a pull-over location 134 within the maximum travel distance, then the impact monitoring system 100, at 630, issues the pull-over recommendation 130 for the future pull-over location 134. If there is not an alternate pull-over location within the maximum travel distance, then the impact monitoring system 100, at 626, issues the pull-over recommendation 130 at the current location of the vehicle 10. The impact monitoring system 100 may also issue an alert to the nearby third party devices 304 to notify third party operators 506 of the presence of the vehicle 10 in the pull-over location 134. The above described steps may be executed by the impact monitoring system 100 in various orders and operations depending on the severity of the impact event 114. The impact monitoring system 100 may execute the steps in the order outlined herein or may alternatively execute some steps before others. It is also contemplated that some steps may be omitted depending on the impact event 114.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described.

The same may also be varied in many ways. Such variations are not to be regarded as a departure from the disclosure, and all such modifications are intended to be included within the scope of the disclosure.

What is claimed is:

1. A computer-implemented method when executed by data processing hardware causes the data processing hardware to perform operations comprising:

receiving sensor data from a plurality of sensors disposed along a vehicle;

identifying an impact event based on the sensor data;

comparing the sensor data and the identified impact event with a series of impact thresholds;

determining an impact score based on the comparison of the sensor data and the identified impact event with the series of impact thresholds;

comparing the impact score with an impact score hierarchy, the impact score hierarchy corresponding to the series of impact thresholds and including a first tier impact score, a second tier impact score, and a third tier impact score;

notifying an operator of the vehicle of the impact event based on the impact score and the impact score hierarchy;

monitoring the impact event using updated sensor data; and determining an estimated travel distance based on the impact event and the updated sensor data by modeling a degradation of a vehicle component as a function of the determined impact score.

2. The method of claim 1, wherein determining the impact score includes determining the impact event has an intermediate impact score corresponding to the second tier impact score of the impact score hierarchy and, in response to the determined intermediate impact score, recommending the operator inspect the vehicle for impact effects.

3. The method of claim 1, wherein determining the impact score includes determining the impact event has a high impact score corresponding to the third tier impact score of the impact score hierarchy and, in response to the determined high impact score, receiving a communication from a communication server to facilitate operation of the vehicle.

4. The method of claim 3, wherein determining the impact event has a high impact score includes identifying a pull-over location.

5. The method of claim 1, wherein determining the estimated travel distance includes determining a component operative duration and notifying the operator of the vehicle of the component operative duration.

6. The method of claim 5, wherein determining the component operative duration includes determining a service date for a component corresponding to the component operative duration and issuing a notification including the service date.

7. The method of claim 1, wherein monitoring the impact event includes notifying third party devices of the impact event and the impact score.

8. An impact monitoring system for a vehicle, the impact monitoring system comprising:

data processing hardware; and memory hardware in communication with the data processing hardware, the memory hardware storing instructions that when executed on the data processing hardware cause the data processing hardware to perform operations comprising:

receiving sensor data from a plurality of sensors disposed along the vehicle;

identifying an impact event based on the sensor data;

comparing the sensor data and the identified impact event with a series of impact thresholds;

determining an impact score based on the comparison of the sensor data and the identified impact event with the series of impact thresholds;

comparing the impact score with an impact score hierarchy, the impact score hierarchy corresponding to the series of impact thresholds;

monitoring the impact event using updated sensor data; and determining an estimated travel distance based on the impact event and the updated sensor data by modeling a degradation of a vehicle component as a function of the determined impact score.

9. The impact monitoring system of claim 8, where determining the estimated travel distance includes determining a component operative duration and notifying the operator of the vehicle of the component operative duration.

10. The impact monitoring system of claim 8, wherein the operations include issuing a notification identifying the impact event based on the impact score and the impact score hierarchy.

11. The impact monitoring system of claim 8, wherein determining the impact score includes determining the impact event has a low impact score corresponding to a first tier impact score of the impact score hierarchy and, in response to the determined low impact score, issuing a notification including a recommended service date.

12. The impact monitoring system of claim 8, wherein monitoring the impact event includes notifying third party devices of the impact event and the impact score.

13. The impact monitoring system of claim 8, wherein the operations include recommending inspecting the vehicle in response to the impact event and the determined impact score.

14. An impact monitoring system comprising:

data processing hardware; and memory hardware in communication with the data processing hardware, the memory hardware storing instructions that when executed on the data processing hardware cause the data processing hardware to perform operations comprising:

receiving sensor data from a plurality of sensors disposed along a vehicle;

identifying an impact event based on the sensor data;

comparing the sensor data and the identified impact event with a series of impact thresholds;

determining an impact score based on the comparison of the sensor data and the identified impact event with the series of impact thresholds;

comparing the impact score with an impact score hierarchy, the impact score hierarchy corresponding to the series of impact thresholds;

monitoring the impact event using updated sensor data; and determining an estimated travel distance by modeling a degradation of a vehicle component as a function of the determined impact score.

15. The impact monitoring system of claim 14, wherein the impact score hierarchy includes a first tier impact score, a second tier impact score, and a third tier impact score and the series of impact thresholds includes a low impact threshold, an intermediate impact threshold, and a high impact threshold.

16. The impact monitoring system of claim 15, wherein determining the impact score includes determining the impact event has a high impact score based on the high impact threshold, the high impact score corresponding to the third tier impact score of the impact score hierarchy and, in response to the determined high impact score, issuing a notification indicating the determined high impact score and including a pull-over recommendation.

17. The impact monitoring system of claim 16, wherein determining the high impact score includes receiving a communication from a communication server to facilitate operation of the vehicle and recommend a pull-over location.

18. The impact monitoring system of claim 16, wherein monitoring the impact event includes issuing a notification to third party devices of the impact event and the determined high impact score.

19. The impact monitoring system of claim 14, wherein determining the estimated travel distance is based on the impact event and the updated sensor data.

* * * * *